March 19, 1963 I. MAYER 3,082,274
EMULSION ALKYLATION OF OLEFINS
Filed May 23, 1956 3 Sheets-Sheet 1

Ivan Mayer Inventor
By Byron O. Dimmick Attorney

Ivan Mayer  Inventor
By Byron O. Dimmick  Attorney

March 19, 1963  I. MAYER  3,082,274
EMULSION ALKYLATION OF OLEFINS
Filed May 23, 1956  3 Sheets-Sheet 3

Ivan Mayer  Inventor

By Byron O. Dimmick  Attorney

United States Patent Office 3,082,274
Patented Mar. 19, 1963

3,082,274
EMULSION ALKYLATION OF OLEFINS
Ivan Mayer, Summit, N.J., assignor to Esso Research
and Engineering Company, a corporation of Delaware
Filed May 23, 1956, Ser. No. 586,797
2 Claims. (Cl. 260—683.46)

This invention relates to improvements in the synthesis of branched chain hydrocarbons by reaction of isoparaffinic hydrocarbons with olefins in the presence of liquid catalysts. Such branched chain hydrocarbons are desirable constituents of automotive and aviation fuels. A particular feature of the invention is the provision of an improved method and apparatus for producing efficient contact between the acid catalyst and the reacting hydrocarbons, thus minimizing acid consumption and improving product yield and quality.

In the alkylation of olefinic material with isoparaffins a particular problem that arises is that of preventing or minimizing the polymerization of the olefins or their degradation into sludge by contact with the alkylation catalyst. A desirable way to solve this problem is to effect the catalytic alkylation reaction under conditions that are designed to avoid, as much as possible, intimate contact of the olefins with the catalyst material in the comparative absence of isoparaffins. This may be accomplished by providing a substantial excess of isoparaffins in the reaction zone and by introducing the olefinic material in successive increments in a continuous series of reaction zones or stages which contain previously emulsified mixtures of isoparaffin, alkylation catalyst and reaction products. Even with these precautions, however, it is difficult to eliminate completely the polymerization of olefins in an emulsion alkylation process.

It is one object of the present invention to provide for more efficient introduction of the olefin into the emulsified mixture of reacting hydrocarbons and acid catalyst, thus improving the quality and yield of product.

It is another object of the invention to provide for more efficient production and maintenance of a hydrocarbon-acid emulsion throughout the reaction zone.

It is still a further object of the invention to provide for efficient flow of emulsion from one stage to the next, within a multistage emulsion alkylation reactor.

In accordance with the present invention olefins are reacted with isoparaffins in the presence of a liquid acid catalyst in a series of stirred, staged, autorefrigerated reaction zones. The heat of reaction, the sensible heat, and the energy of mixing are removed from each of the reaction zones by evaporation of a portion of the hydrocarbons flowing through the system, thus maintaining the reaction temperature at the desired level. The vapors thus removed are compressed, condensed, and returned to the leading reaction zone or stage.

One particular feature of the invention is the use of an alkylation reactor providing for maximum efficiency of contact between the olefins and the emulsfied mixture of acid catalyst and isoparaffin. Another particular feature is the provision of baffles within the reactor to insure maximum emulsifying efficiency.

Although the invention is particularly described with reference to the alkylation of isobutane with butylenes, in the presence of sulfuric acid as a catalyst, it is not intended that the invention be limited to this particular alkylation reaction, as the same principles can be applied to related reactions using other isoparaffins such as isopentane and other olefins such as propylene or amylenes. Likewise, although sulfuric acid is typical of the acid catalyst that may be employed in practicing the invention, it is intended that the invention also be used with other suitable liquid catalysts, including mixtures of sulfuric and phosphoric acids, hydrofluoric acid, aluminum chloride-boron fluoride complexes and the like.

The objects of the invention as well as the nature of the invention and the manner in which it is utilized will be more readily and fully understood when reference is made to the accompanying drawings in which.

Figure 1:
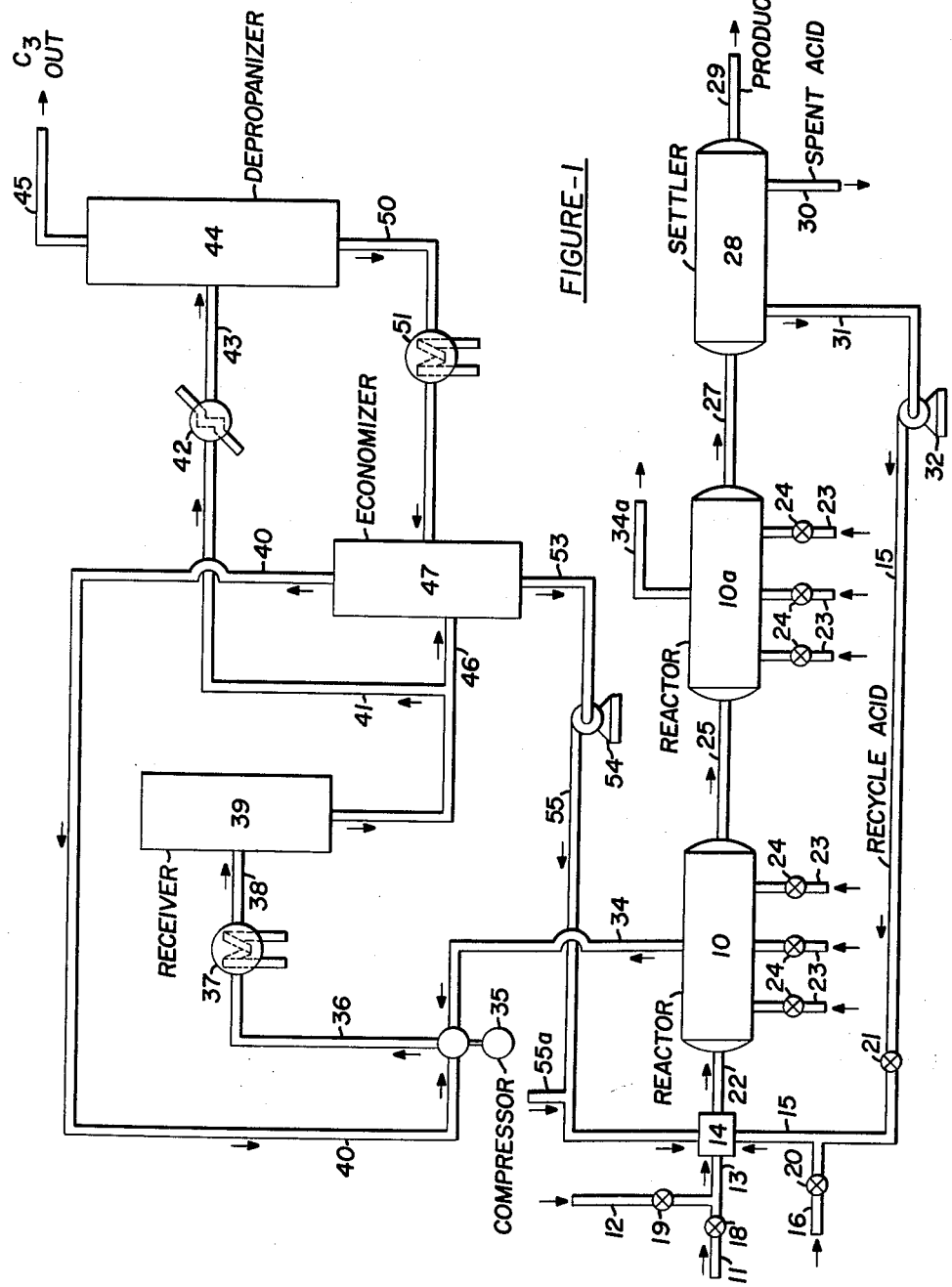
FIGURE 1 is a diagrammatic representation of apparatus suitable for accomplishing the alkylation process of the present invention.

As stated, the invention will be particularly described with reference to the alkylation of isobutane with butylene in the presence of concentrated sulfuric acid as catalyst. Referring now to FIGURE 1 in detail the general features of the alkylation process may be understood.

A reaction vessel 10 is employed which may be of such size as is required by the volume of material to be handled and by the residence time required for effecting the alkylation reaction. Preferably two or more reactors 10, 10a, etc. are employed in series so that control of the reaction temperature may be effected by autorefrigeration, the amount of isobutane being removed from the reaction emulsion to effect the desired refrigeration being controlled by the pressure within the reactor. By employing enough separate pressure stages the reaction temperature can be held essentailly isothermal.

It is preferred for proper control of the reaction and for prevention of corrosion in the refrigeration system that the acid and isoparaffin be mixed before entering the first reactor. Thus an isobutane feed made up of fresh isobutane entering through line 11 and of recycle isobutane entering through line 12 is conducted by means of line 13 to a mixing zone 14 where it is mixed with sulfuric acid that enters the mixing zone through fresh acid line 16 and recycle acid line 15. Additional recycle isobutane enters the mixing zone through line 55. A minor proportion of the recycle isobutane (e.g. about one-third) is obtained from the product recovery system which is not shown in the figure, while the major amount of recycle isobutane (e.g. the remaining two-thirds) comes from the economizer and depropanizer system which will be described in connection with FIGURE 1. The rates of flow of fresh acid and recycle acid are controlled by valves 20 and 21. Likewise the rates of flow of fresh isobutane and product recovery recycle isobutane are controlled by valves 18 and 19.

The mixture of acid and isobutane that is prepared in zone 14 is conducted through line 22 into reactor 10 into which a plurality of streams of butylenes are fed by means of lines 23, the rates of feed being controlled by the valves 24.

As will be more clearly explained in connection with the subsequent figures of the drawing, the mixture of acid, isobutane and butylenes is maintained as a well mixed emulsion in the reactor 10 by mechanical stirrers and appropriate baffles. A portion of the emulsion is continuously withdrawn from reactor 10 and conducted into a second similar reactor 10a through line 25. Although only two reactors 10 and 10a are shown, it is advantageous for proper temperature control to employ three or four such reactors in series.

A portion of the emulsion in reactor 10a is continuously conducted through line 27 to a product settler 28 where separation between hydrocarbons and acid catalyst takes place. The separated hydrocarbons are removed from the settler through line 29 and sent through the conventional caustic and water wash steps and a subsequent fractionation step. These portions of the flow scheme are not shown in FIGURE 1 as they do not constitute a part of the novel aspects of the present invention. Spent acid catalyst from the product settler is discarded through line 30 while the major portion of the separated acid catalyst is recycled through line 31, pump 32 and line 15 to the mixing zone 14.

As previously mentioned, the reaction temperature is maintained at the desired level by autorefrigeration. To accomplish this, overhead vapors from the reactor 10 are carried through line 34 to a compressor 35. The compressed vapor is conducted through line 36 to a cooler 37 and is then discharged into an isobutane receiver 39 through line 38. The liquid that collects in the receiver 39 is split into two streams, one of which flows through line 41 to a heater 42 from whence the heated material is carried by line 43 to a depropanizing tower 44. The other stream from the receiver 39 flows through line 46 and is flashed into economizer drum 47. The temperature in the economizer drum is appreciably lower than that in the receiver. As a representative example the temperature in the receiver may be about 100° F. and that in the economizer about 50° F.

Propane is removed from the depropanizer tower 44 by lines 45 and is sent to storage. The bottoms from the depropanizer are sent through line 50 to a cooler 51 and from there by means of line 52 into the economizer drum 47.

Vapors from the economizer are conducted by line 40 back to the compressor 35 and the flashed condensate from the economizer is conducted by line 53 to a pump 54 which sends the condensate through line 55 back to the acid mixer 14 so that it can be recycled through the reactors.

Overhead vapors from rector 10a are handled in a manner similar to that described above, being carried through line 34a to a separate compressor, receiver and economizer drum system, which is not shown in the drawing, but which is similar to the system just described except that no depropanizer is used. Instead, all of the condensate from the receiver is sent to the economizer drum of that system and is then added to line 55 through line 55a to be recycled to the initial stage of the first reactor. If additional reactors are employed in the series the overhead vapors from those reactors are handled in the same manner as the vapors from reactors 10a.

By routing all of the compressor condensate from the overhead vapors of all of the reactors, subsequent to the initial reactor, back to the inlet of the lead reactor, a substantial amount of propane is built up in the first stage of the system. The material that vaporizes in the lead reaction stage and flash zone of the system, as a result of the heat of reaction, the sensible heat in the recycled hydrocarbons and the energy expended in stirring the emulsion, is therefore enriched in propane relative to the subsequent stages. This increases the efficiency with which propane can be removed from the system and thus enables the propane to be maintained at an exceptionally low level in the alkylation reactors.

Figure 2:
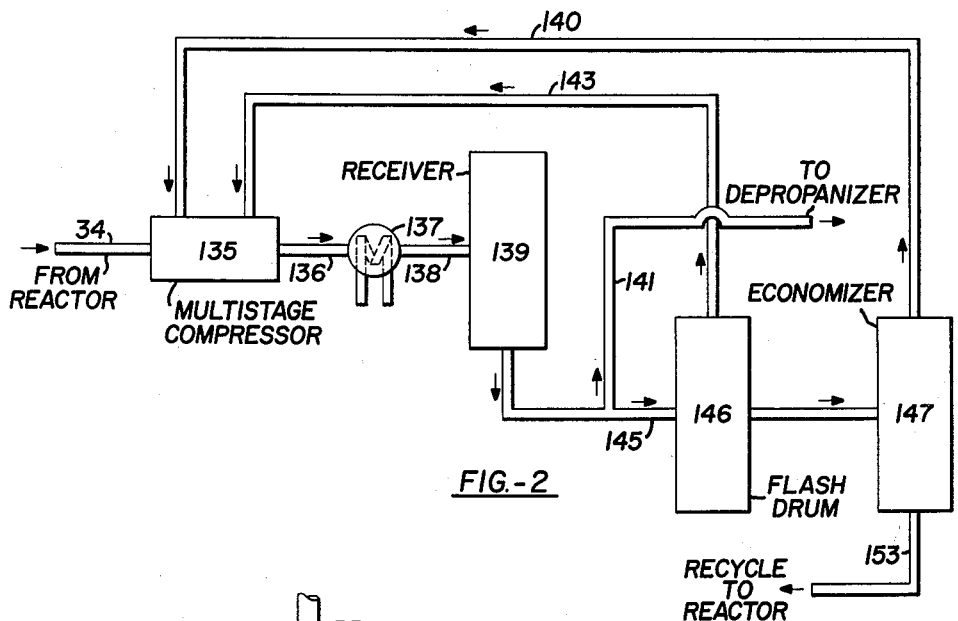
FIGURE 2 is a diagrammatic representation of a preferred form of multi-stage refrigeration system.

More efficient refrigeration is obtained with a smaller power requirement if a multistage refrigeration system is employed as shown in FIGURE 2. In place of the compressor 35 of FIGURE 1, a multistage compressor 135 is employed. Overhead vapors from the reactor enter the compressor through line 34, are then conducted through line 136 to a cooler 137 and then discharged into a receiver 139 through line 138 in the same manner as described in connection with FIGURE 1. As in FIGURE 1 the liquid from the receiver 139 is divided into two streams, one of which flows through line 141 to the depropanizer and the other which flows through line 145 into a flash drum 146. Vapors accumulating in the flash drum are carried overhead through line 143 to one of the final stages of the multistage compressor, while liquid from the flash drum flows into economizer 147. Vapors from the economizer are carried overhead through line 140 to an earlier stage of the multistage compressor, while the liquid that collects in the economizer is recycled through line 153 to the reactor in the same manner as described in connection with FIGURE 1. As a representative example the liquid in the receiver 139 will have a temperature of about 105° F. and will be flashed to a temperature of about 75° F. in the flash drum 146. Liquid from the flash drum will be flashed to a temperature of about 50° F. in to the economizer.

Figure 3:
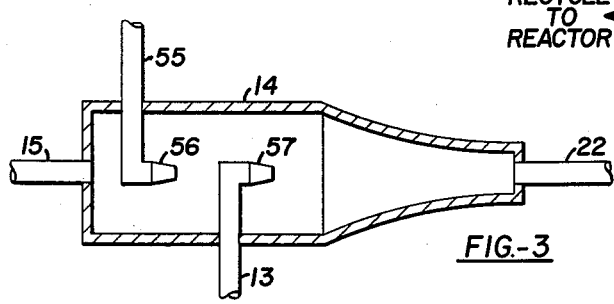
FIGURE 3 is a sectional view of a preferred form of chamber for mixing the acid and isoparaffin.

Another desirable feature of the invention is shown in FIGURE 3 which illustrates in sectional detail a preferred form of mixing chamber for the acid and isobutane. Since the recycled condensate from the refrigeration system contains a small amount of $SO_2$ and since the recycle isobutane and the fresh isobutane may contain water, it is not desirable to mix these two streams prior to their introduction into the reactor because the $SO_2$ will combine with the moisture to form corrosive sulphurous acid. Therefore the condensate isobutane from the refrigeration system entering through line 55 is discharged through a nozzle 56 into the stream of acid entering the mixing chamber 14 through line 15. Downstream from the point of introduction of the condensate isobutane, the recycle isobutane and fresh isobutane entering through line 13 are discharged into the acid stream through a nozzle 57. Backflow of acid into the lines 13 and 55 is prevented or minimized by discharging the hydrocarbon streams concentrically with the acid stream in the manner shown. Also to minimize corrosion, the acid mixing chamber and the nozzles 56 and 57 are preferably constructed of a corrosion resistant alloy such as Hastelloy. The relatively small proportion of water in the recycle isobutane streams is readily absorbed in the relatively large volume of acid so that there is little or no corrosion problem once the mixing of acid and hydrocarbon has been completed. Hence it is not necessary that the flow line 22 be constructed of specially acid resistant material.

In FIGURES 4 to 8 inclusive are shown details of the design of a suitable multistage reactor for effecting the alkylation reaction of this invention. This design provides for successive stages or zones within the reactor, with each stage being isolated by appropriate baffles and with stirring means in each stage or zone. Olefin is introduced separately into each of the zones. Considering now FIGURES 4 and 5 in detail, reactor 10 comprises a horizontal cylindrical vessel having an inlet 61, through which the mixture of acid catalyst and isoparaffin enters the reactor, and a plurality of vertical baffles 62a, 62b, etc. which divide the reactor into separate reaction zones 67a, 67b and so on. It is preferred that each reactor have five or six of such zones in series, although only two complete zones are shown.

A quantity of fill material 63 occupies the inlet end of the vessel to provide a vertical wall for the inlet end of the first reaction zone. Conveniently, this fill material may comprise a phenolic resin containing carbon particles. A flat surface 64 is provided above the fill material adjacent the inlet 61 to serve as a flash pan for removal of vapors from the entering mixture and thus minimize mixer impeller cavitation during the stirring of the emulsion. As much as 60 percent of the vapors accumulating in the reactor may originate on or in the vicinity of the flash pan; hence the flash surface is an important feature of the invention.

The reaction mixture in each of the zones is kept agitated by a flat blade stirrer 65 driven by a motor 66. It will be seen that this type of stirrer provides a plurality of surfaces rotating in a plane, with the surfaces arranged normal to the plane of rotation. A stream of olefin is injected into each of the reaction zones through a ring 68 about which are distributed a plurality of orifice nozzles 69, the ring being centrally positioned adjacent the stirrer 65. The olefin enters the distributing ring through inlet pipe 70. The orifice nozzles are preferably of small internal diameter so as to eject the olefin streams at exceedingly high velocities, and preferably are directed upward and outward from the distribution ring, as shown. By using orifice nozzles instead of simple orifices in the distribution ring itself, acid is prevented from flowing into the distribution ring. Also the upward and outward direction of the nozzles causes the olefin to be introduced into each reaction zone in the region immediately outward of the rotating blade surfaces, and thus into the immediate vicinity of the area of agitation produced by the stirrer blades. The orifice nozzles are preferably constructed of an alloy such as Hastelloy B.

Figure 5:
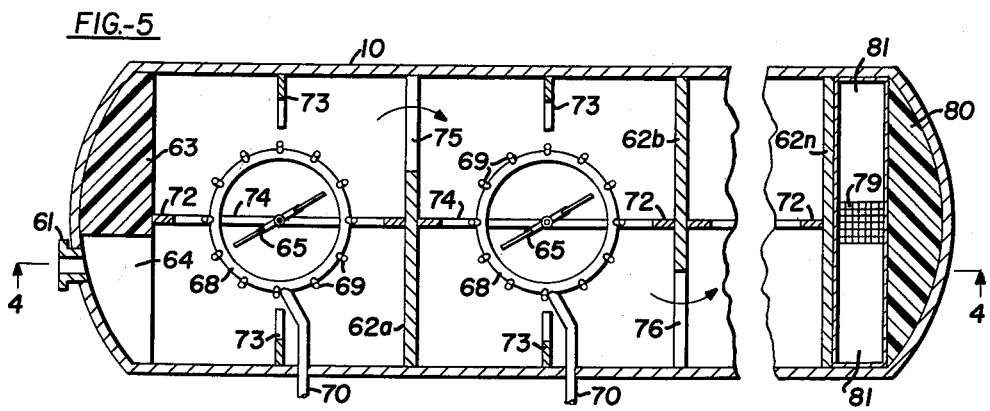
FIGURE 5 is a broken sectional plan view taken on line 5—5 of FIGURE 4.

As shown more clearly in FIGURE 5 auxiliary vertical baffles 72 and 73 are positioned within each of the reaction zones. Also a central ridge baffle 74 is placed on the bottom of each zone. These auxiliary baffles ensure that there will be highly efficient mixing of the olefin with the isoparaffin and acid catalyst.

As additional isoparaffin and acid catalyst enter the reactor inlet the reaction mixture will flow from zone to zone toward the emulsion outlet 78. By providing separate zones or stages, and by introducing the olefin separately into each well agitated zone, the danger that excess olefin will be present at any time is substantially eliminated, thereby preventing the undesirable side reactions of olefin polymerization and sludge formation.

A vapor outlet 77 is provided at the top of the reactor so that volatile hydrocarbons may be removed overhead to regulate the reaction temperature by autorefrigeration.

Figure 6:
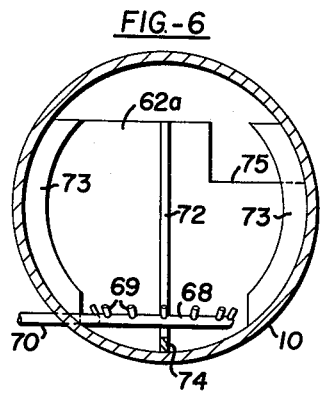
FIGURE 6 is a sectional elevation taken on line 6—6, of FIGURE 4.
Figure 7:
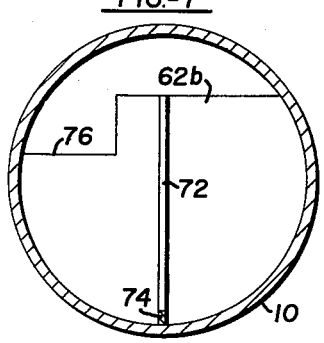
FIGURE 7 is a sectional elevation taken on line 7—7 of FIGURE 4.
Figure 8:
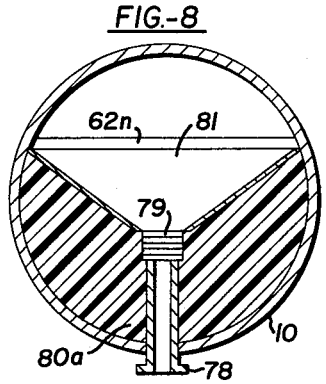
FIGURE 8 is a sectional elevation taken on line 8—8 of FIGURE 4.

The top edge of each of the vertical baffles 62 except the final one is stepped down on one side so that flow from one reaction zone to the next takes place on only one side of the baffle. Also, the steps on successive baffles alternate from side to side. Thus baffle 62a as shown in FIGURE 6 has a step 75 on the right-hand side and baffle 62b as shown in FIGURE 7 has a step 76 on the left-hand side. As shown by the arrows in FIGURE 5 this causes the emulsion to take a tortuous path through the reactor, thus minimizing any tendency for the emulsion to bypass any of the zones. Such baffles are referred to as side flow baffles. The final baffle 62n does not have a stepped down edge but is at the same height across its entire top edge. The height of the latter baffle controls the height of the liquid level in the reactor.

The outlet end of the reactor is partially filled in with material 80 of a similar nature to that of fill material 63 at the inlet end. This reduces the volume of the space between the last baffle 62n and the end of the vessel, thus minimizing holdup time in this region and preventing undesirable side reactions which tend to occur in poorly mixed zones. The outlet chamber 81 thus formed has a sloping bottom, as shown, to direct the emulsion to the outlet 78, a conventional type of anti-vortex baffle 79 being provided at the top of the outlet.

Figure 9:
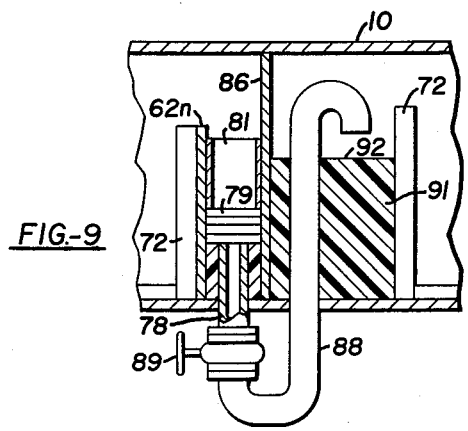
FIGURE 9 is a fragmentary side elevational view of a modification of the apparatus of FIGURE 4.
Figure 4:
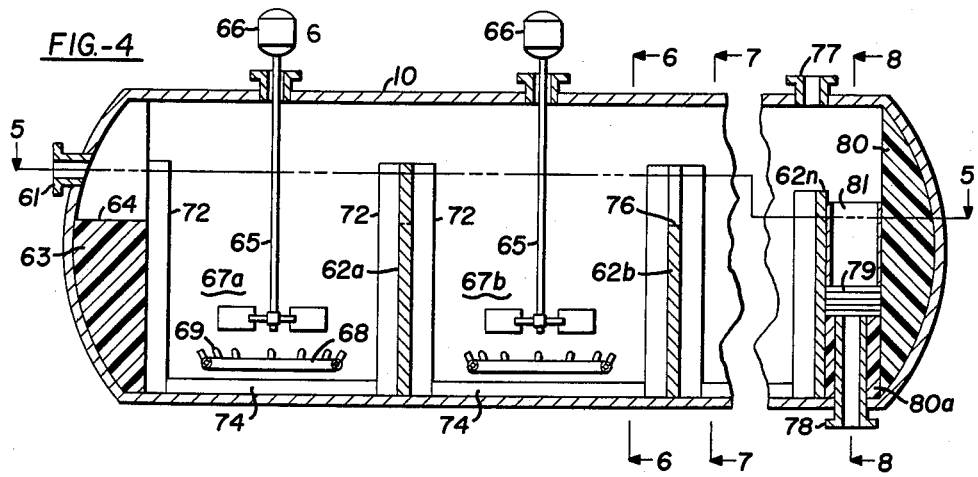
FIGURE 4 is a broken sectional side elevation of a preferred form of alklation reactor embodying the present invention, the view being taken on line 4—4 of FIGURE 5.

Illustrated by FIGURE 9 is an alternative arrangement of the reactors wherein in effect two successive reactors can be constructed within a single vessel. This is accomplished by placing a pressure baffle 86 in the center of the vessel to divide it into two separate compartments. Each compartment is divided into a plurality of reaction zones by the use of vertical baffles 62 in the same manner as shown in FIGURES 4 and 5. The outlet 78 of the first reactor is connected to the inlet 87 of the second reactor by means of a connecting line 88 and the flow between the two reactors is controlled by valve 89. A body of inert fill material 91 within the second compartment is provided with a flat top surface 92 to present a flash pan arrangement similar to that in the first reactor as illustrated in FIGURES 4 and 5.

In a representative alkylation reaction wherein butylenes are alkylated with isobutane in the presence of sulfuric acid of 90 to 95% strength (weight percent of titratable acid) to produce about 10,000 barrels per stream day (b./s.d.) of alkylate, about 5700 b./s.d. of olefins and about 6700 b./s.d. of fresh isobutane will be consumed. As it is preferred to maintain a substantial molar excess of isoparaffin to the olefin in the alkylation reaction, considerable isobutane from the reaction product is recycled to the lead reactor so that the reactors actually handle about 14,000 b./s.d. of isobutane. Likewise, although the above quantities of hydrocarbon materials may require about 84 tons of fresh 98% sulfuric acid per stream day, the actual amount of acid flowing through the system per day will be much greater since the ratio of recycle acid to fresh acid may be of the order of 200 to 1 or more.

In the first stage of the first reactor, 85% of the hydrocarbon content of the emulsion will be isobutane and in the reaction product from the last stage of the final reactor 45% of the hydrocarbons will comprise isobutane.

In an emulsion type alkylation reaction it is normally desirable to operate the process with a very high proportion of acid in the reaction zone. Tests have shown that in order to ensure stability of hydrocarbon-acid emulsions, the acid phase should make up at least half of the emulsion volume. Additional tests have shown that it is quite difficult to obtain homogeneous emulsions at reasonable power inputs in mixing zones containing less than about 60% acid. Thus, in order to assure smooth and efficient operation the acid catalyst in the emulsion alkylation reactor should preferably make up 60 to 70 percent of the volume of the emulsion of acid and hydrocarbon.

By operating the reactors 10 in series it is possible to maintain substantially the same reaction temperature throughout the series by adjustment of the pressure in each reactor to remove hydrocarbons overhead and thus effect autorefrigeration. As a typical example, a reaction temperature of 40° F. ±3° F. may be maintained in each of four reactors in series by keeping the pressures at about 26, 24, 21, and 18 p.s.i.a., respectively.

As an additional feature of the present invention it is preferred that the olefin be chilled before it enters the reactors in order to prevent its vaporization, because vaporization in the vicinity of the impeller blades tends to cause impeller cavitation and thus reduce emulsification efficiency. For example when maintaining a reaction temperature of the order of 40° F. it is desirable to chill the olefin to 35° F. or less so that the olefin will be below its bubble point temperature at a pressure equal to the minimum in the reactor. Vaporization of the olefin is also to be avoided for the reason that it may be carried into the refrigeration and condensate return systems and cause unfavorable reactions there.

It is not intended that this invention be limited to the specific embodiments presented and described herein, as many modifications thereof are possible without departing from the scope of the invention, defined in the following claims.

What is claimed is:

1. In the process of forming branched chain saturated hydrocarbons by contacting an emulsion of isoparaffinic hydrocarbons and a liquid acid catalyst with a stream of olefins wherein the acid catalyst and isoparaffinic hydrocarbons are admixed in the absence of added olefin in an acid mixing zone and then agitated in a stirred reaction zone within a pressure vessel and contacted with small portions of an olefin stream introduced into said reaction zone immediately adjacent the point of agitation, and wherein the reaction temperature is controlled by vaporization of a portion of the hydrocarbons, the improvement which comprises employing at least two such pressure vessels in series, compressing and cooling the vapors from each of said pressure vessels and recycling the thus recovered vapors to the acid mixing zone and subjecting the vapors from only the first of said vessels to a depropanizing step, said isoparaffinic hydrocarbon comprising isobutane.

2. In the process of forming branched chain saturated hydrocarbons by contacting an emulsion of isoparaffinic hydrocarbons and a liquid acid catalyst with a stream of olefins wherein the acid catalyst and isoparaffinic hydrocarbons are admixed in the absence of added olefin in an acid mixing zone and then agitated in a stirred reaction zone within a pressure vessel and contacted with small portions of an olefin stream introduced into said reaction zone immediately adjacent the point of agitation, and wherein the reaction temperature is controlled by vaporization of a portion of the hydrocarbons, said isoparaffinic hydrocarbons comprising fresh isoparaffins, recycle isoparaffins from the product of the process, and condensate isoparaffins obtained from controlling the reaction temperature within the vessel by vaporizing a portion of the hydrocarbons within the vessel and removing the vapors from the vessel, the improvement which comprises admixing said condensate isoparaffins with said acid catalyst before said fresh isoparaffins and said recycle isoparaffins are admixed with said acid catalyst, whereby formation of sulfurous acid from $SO_2$ in said condensate isoparaffins and from water in said fresh and recycle isoparaffins is prevented.

References Cited in the file of this patent
UNITED STATES PATENTS

| | | |
|---|---|---|
| 708,028 | Crawley | Sept. 2, 1902 |
| 1,402,318 | Rodebush | Jan. 3, 1922 |
| 2,344,015 | Allred | Mar. 14, 1944 |
| 2,366,627 | Kemp | Jan. 2, 1945 |
| 2,429,205 | Jenny et al. | Oct. 21, 1947 |
| 2,454,869 | Goldsby et al. | Nov. 30, 1948 |
| 2,460,083 | Harbaugh | Jan. 25, 1949 |
| 2,474,924 | Watson et al. | July 5, 1949 |
| 2,618,534 | Mrstik | Nov. 18, 1952 |
| 2,664,452 | Putney | Dec. 29, 1953 |
| 2,768,987 | Hart | Oct. 30, 1956 |
| 2,828,348 | Stiles et al. | Mar. 25, 1958 |
| 2,829,181 | Stiles et al. | Apr. 1, 1958 |
| 2,852,581 | Stiles | Sept. 16, 1958 |
| 2,920,124 | Stiles et al. | Jan. 5, 1960 |